US009118181B2

(12) United States Patent
Balcerek et al.

(10) Patent No.: US 9,118,181 B2
(45) Date of Patent: Aug. 25, 2015

(54) METHOD OF FAULT PHASE SELECTION AND FAULT TYPE DETERMINATION

(75) Inventors: Przemyslaw Balcerek, Cracow (PL); Marek Fulczyk, Kedzierzyn-Kozle (PL); Eugeniusz Rosolowski, Wroclaw (PL); Jan Izykowski, Wroclaw (PL); Murari Saha, Vasteras (SE); Piotr Pierz, Wroclaw (PL)

(73) Assignee: ABB RESEARCH LTD, Zurich (CH)

( * ) Notice: Subject to any disclaimer, the term of this patent is extended or adjusted under 35 U.S.C. 154(b) by 753 days.

(21) Appl. No.: 13/384,637

(22) PCT Filed: Aug. 6, 2010

(86) PCT No.: PCT/EP2010/004970
§ 371 (c)(1),
(2), (4) Date: Jan. 18, 2012

(87) PCT Pub. No.: WO2011/023305
PCT Pub. Date: Mar. 3, 2011

(65) Prior Publication Data
US 2012/0150460 A1 Jun. 14, 2012

(30) Foreign Application Priority Data
Aug. 31, 2009 (EP) .................................. 09460038

(51) Int. Cl.
*H02H 3/16* (2006.01)
*H02H 3/34* (2006.01)
*H02H 1/00* (2006.01)
*H02H 7/26* (2006.01)

(52) U.S. Cl.
CPC ............... *H02H 3/34* (2013.01); *H02H 1/0092* (2013.01); *H02H 7/26* (2013.01)

(58) Field of Classification Search
CPC ....... H02H 3/083; H02H 3/165; G01R 31/026
USPC .......................................................... 702/58
See application file for complete search history.

(56) References Cited

U.S. PATENT DOCUMENTS

| 4,409,636 | A | 10/1983 | Brandt et al. ................... 361/87 |
| 5,390,067 | A | 2/1995 | Eriksson et al. ................ 361/79 |
| 5,783,946 | A * | 7/1998 | Yang .............................. 324/522 |
| 2003/0142450 | A1* | 7/2003 | Bo .................................. 361/62 |
| 2006/0152866 | A1* | 7/2006 | Benmouyal et al. ............. 361/42 |

FOREIGN PATENT DOCUMENTS

| GB | 2 051 509 A | 1/1981 | ............... H02H 3/00 |
| JP | 2003 009381 | 1/2003 | ............. G01R 31/08 |

OTHER PUBLICATIONS

International Search Report in corresponding application No. PCT/EP2010/004970 as mailed Oct. 21, 2010.

* cited by examiner

*Primary Examiner* — Janet Suglo
*Assistant Examiner* — Michael Dalbo
(74) *Attorney, Agent, or Firm* — Renner Kenner Greive Bobak Taylor & Weber

(57) ABSTRACT

The present invention is concerned with a method for faulted phase selection and fault type determination in electric power lines applicable both to series compensated and uncompensated power lines. The method comprising a fault inception detection and an estimation of fault phase current signals, pre-fault current signals and zero-sequence current in order to receive the absolute value of incremental current signals and their maximum value from which real value indicators for phase to phase faults, real value indicators for 3-phase fault and a real value indicator for ground fault are determined. The method further comprises
  calculating the maximum of the value of all fault type indicators ($F_{flt}$),
  determining the fault type, which determines the fault type on the basis that the index (flt) means the specific type of fault indicated by the value of flt; and
  presenting the real fault type indicator ($F_{max}$).

6 Claims, 3 Drawing Sheets

METHOD OF FAULT PHASE SELECTION AND FAULT TYPE DETERMINATION

CROSS-REFERENCE TO RELATED APPLICATION

This is a §371 application of International patent application number PCT/EP2010/004970 filed Aug. 6, 2010, which claims priority of European patent application number 09460038.4 filed on Aug. 31, 2009, both of which are incorporated herein by reference.

TECHNICAL FIELD

The present invention is concerned with a method for faulted phase selection and fault type determination in electric power lines applicable both to series compensated and uncompensated power lines, fit for use in the power industry for overhead and overhead-cable transmission or distribution lines.

BACKGROUND ART

Fast and reliable fault type determination of the fault in electric power lines is of great importance both for power companies dealing with electric energy distribution and for end users of electric energy. Quick and exact fault type selection affects the quality of power system protection. A means for fault phase selection and fault type determination is usually a part of a digital protection relay located in power stations or substations. Depending on the fault type, different current and voltage fault loops are distinguished and processed in the protection relay. Therefore the proper fault type selection influences the final operation of the protection relay and an error in the fault type identification may lead to maloperation of the protection relay.

An example of a protection relay that utilizes a faulted phase selection is described in U.S. Pat. No. 4,409,636. In this solution the delta based phase selector has been known not to reliably detect three-phase faults. It calculates the percentage of the largest faulted value, and then subtracts it from the phases. If the result is a positive value the phase is detected faulted. If negative, the phase is not faulted. Often, in a three-phase fault, one of the faulted phases does not reach this level, and the phase remains undetected. Another example of a method and a device for phase selection for single-phase tripping of high-impedance ground faults is described in a U.S. Pat. No. 5,390,067. The U.S. Pat. No. 5,390,067 is limited to the selection of a single ground fault. Application of the method is limited to the networks with the earthed neutral point.

The mentioned disadvantages are overcome by the method, the device and the computer program as defined in claims 1, 2 and 3 respectively.

From JP patent application JP 2001192428 (publication No. JP2003009381) there is known a method for faulty phase selection in multi terminal system. In this method a phase selector is used, which comprises a first operating means for calculating the differential current of each phase of each transmission line; a second operating means for calculating the line differential current of a faulty line, based on the differential current of each phase obtain from the first operating means and faulty line information, a third operating means for determining the ratio of a minimum value to a maximum value obtained from the second operating means; a fourth operating means for making decision that a single phase fault has occurred, if ratio obtained from the third operating means is smaller than a specified value; a fifth operating means for determining the ratio of a differential current in the phase not constituting a maximum value to a smaller differential current, with regard to differential currents of two phases constituting the maximum value of line differential current; a sixth operating means for making a decision that a two-phase fault has occurred if a ratio obtained from the fifth operating means is smaller than a specified value; and seventh operating means for deciding that a three-phase fault has occurred, when the ratio obtained from the fifth operating means is not smaller than the specified value. Generally, there are problems with selection of a three-phase fault because one of the faulted phases does not reach a setting level. Moreover, the application of the method is limited to the networks with the earthed neutral point.

A process for identifying the type of fault detected by a protection relay is known from patent description U.S. Pat. No. 5,783,946. This process includes measuring pre-fault and post-fault samples of current waveforms on the phase-A, phase-B and phase-C conductors of a transmission line. Next increment currents DELIA1, DELIB1 and DELIC1 are calculated, where $$DELIA1 = (I_{ar}-I_{apr})^2-(I_{ai}-I_{api})^2,$$

$$DELIB1 = (I_{br}-I_{bpr})^2-(I_{bi}-I_{bpi})^2,$$

$$DELIC1 = (I_{cr}-I_{cpr})^2-(I_{ci}-I_{cpi})^2.$$

The increment currents are then employed to identify a two-phase to ground fault. In calculating the increment currents, $I_{ar}$ represents a post-fault value of the real part of the phase-A current, $I_{apr}$ represents a pre-fault value of the real part of of the phase-A current, $I_{ai}$ represents a post-fault value of the imaginary part of the phase-A current and $I_{api}$ represents a pre-fault value of the real part of the phase-A current. The phase-B and phase-C value are denoted accordingly. The fault type is estimated by using crisp logical operators—greater than, less than.

SUMMARY OF THE INVENTION

A method of fault phase selection and fault type determination in electric power lines, according to the invention, making use of a protection relay having means for fault detection and computer means for signal and data processing, using a fault inception detection and an estimation of fault phase current signals, pre-fault current signals and zero-sequence current in order to receive the absolute value of incremental current signals $I_{AB}$, $I_{BC}$, $I_{CA}$ and their maximum value $I_{max}$ from which real value indicators for phase to phase faults $S_A, S_B, S_C$, real value indicators for 3-phase fault $S_{3A}, S_{3B}, S_{3C}$ and a real value indicator for ground fault $S_G$ are determined, the method further comprises the following steps:

calculating the maximum of the value of all fault type indicators $F_{ft}$ according to the formula:

$$F_{max} = \max(\{F_{ft}\}),$$

where the index fit is an integer number from 1 to 10 and means one specific type of all type faults, determination of the fault type as one of the indicator $F_{ft}$ having the maximal value, which at the same time determines the fault type on the base that the index fit means the type of fault, where if:

flt=1 then there is a phase A to ground G fault,
flt=2 then there is a phase B to ground G fault,
flt=3 then there is a phase C to ground G fault,
flt=4 then there is a phase A to phase B fault, flt=5 then there is a phase B to phase C fault,
flt=6 then there is a phase C to phase A fault,
flt=7 then there is a phase A to phase B and to ground G fault,
flt=8 then there is a phase B to phase C and to ground G fault,
flt=9 then there is a phase C to phase A and to ground G fault,
flt=10 then there is a phase A to phase B to phase C fault,
presentation the of real fault type indicator $F_{max}$ in the protection relay (2) or in the means connected to the protection relay.

The calculation of the fault type indicators $F_{flt}$ is realized as the minimum values of the real values indicators $S_A, S_B, S_C, S_{3A}, S_{3B}, S_{3C}, S_G$ in the following way:

calculating the sum of the minimum value of the combination of real value indicators $(S_A, S_G)$, $(S_B, S_G)$, $(S_C, S_G)$, $(S_{3B}, S_{3C})$, $(S_{3C}, S_{3A})$, $(S_{3A}, S_{3B})$ and the real value indicators $S_{3A}, S_{3B}, S_{3C}$ for phase to ground fault, according to the following formulas:

$F_1 = \min(S_A, S_G) + \min(S_{3B}, S_{3C}) - S_{3A}$, for phase $A$ to ground $G$ fault, $F_2 = \min(S_B, S_G) + \min(S_{3C}, S_{3A}) - S_{3B}$, for phase $B$ to ground $G$ fault, $F_3 = \min(S_C, S_G) + \min(S_{3A}, S_{3B}) - S_{3C}$, for phase $C$ to ground $G$ fault, what gives the first group of indicators $F_1$, $F_2$; $F_3$;

calculating the minimum value of the combination of real value indicators $(S_A, S_B)$, $(S_B, S_C)$, $(S_C, S_A)$ for phase to phase fault, according to the following formulas:

$F_4 = \min(S_A, S_B)$, for phase $A$ to phase $B$ fault, $F_5 = \min(S_B, S_C)$, for phase $B$ to phase $C$ fault, $F_6 = \min(S_C, S_A)$, for phase $C$ to phase $A$ fault, what gives the second group indicators $F_4$, $F_5$, $F_6$;

calculating the sum of the previously calculated indicator $F_1$-$F_6$ for phase to phase to ground faults, as the sum of previously calculated fault type indicators according to the following formulas:

$F_7 = F_1 + F_2 + F_4$, for phase $A$ to phase $B$ and to ground $G$ fault, $F_8 = F_2 + F_3 + F_5$, for phase $B$ to phase $C$ and to ground $G$ fault, $F_9 = F_3 + F_1 + F_6$, for phase $C$ to phase $A$ and to ground $G$ fault, what gives the third group indicators $F_7$, $F_8$, $F_9$;

calculating the minimum value of real value indicators $S_{3A}, S_{3B}, S_{3C}$, according to the formula:

$F_{10} = \min(S_{3A}, S_{3B}, S_{3C})$, for phase $A$ to phase $B$ to phase $C$ fault, what gives the indicator $F_{10}$.

The device for implementing the method according to claims 1-2 of fault phase selection and fault type determination in electric power lines, comprising means for current signal filtering, fault inception time identification, pre-fault and fault current signal determination, incremental current calculation and maximal value of incremental current signal calculation, embedded in a protective protection relay in a pre-filtering block of a fault phase selection and fault type determination module further contains:

means for calculating real value indicators $S_A, S_B, S_{3A}, S_{3B}, S_{3C}$ which indicate the minimum values of a combination of data for phase to phase faults and for a 3-phase fault and indicate the maximum value of data for a phase to ground fault $S_G$ embedded in the protection relay in a data analysis block of the fault phase selection and fault type determination module of the protection relay, means for calculating fault type indicators $F_1$-$F_{10}$ as the minimum values of real value indicators embedded in a selector block of the fault phase selection and fault type determination module of the protection relay, means for selecting the fault phase and for determining the fault type by calculating the maximum value of the all fault type indicators $F_1$-$F_{10}$ embedded in a fault type decision block of the fault phase selection and fault type determination module of the protection relay, means for presenting the data in the information module of the protection relay or in the means connected to the protection relay.

A computer program product comprising computer program code which when executed on a computing device carries out the steps of a method according to the claims 1-2.

The inventive method is used in a protection relay having modules for faulted phase selection and fault type determination. A real time digital current signals coming from current transformers and converted in an A/D converter or a digital signal compatible with IEC 61850 standard is transmitted by the IEC 618550 9-2 protocol or any other communication protocol. The conversion of analogue signals, measured phase current signals $i_A$, $i_B$, $i_C$ with the aid of the current instrument transformer CT to obtain sampled discrete time values, in this context and interconnection by means of the station communication protocol preferably compatible with the IEC 61850 standard should be regarded as conventional techniques and have therefore been omitted.

The present invention relates to a method for faulted phase selection and fault type determination based on only current signal measurements. Thanks to the inventive approach high reliability of identification of the faulted phase is achieved. The developed method is fast and permits to identify any types of faults with superior reliability even for high-impedance faults. The fault type is estimated using soft operators like: minimal, maximal instead of crisp logical operators greater than, less than. The decision is determined for the consecutive samples by calculating real value indicator indices. All these indices are continuous real values—not logical. The main feature of the proposed method consists in the new way for making the final decision. The decision for fault-type selection is scheduled in the way that the greater value pointed on the more probable selection.

BRIEF DESCRIPTION OF THE DRAWINGS

A method of fault phase selection is presented in the drawing, where.

BEST MODE FOR CARRYING OUT THE INVENTION

Figure 1:
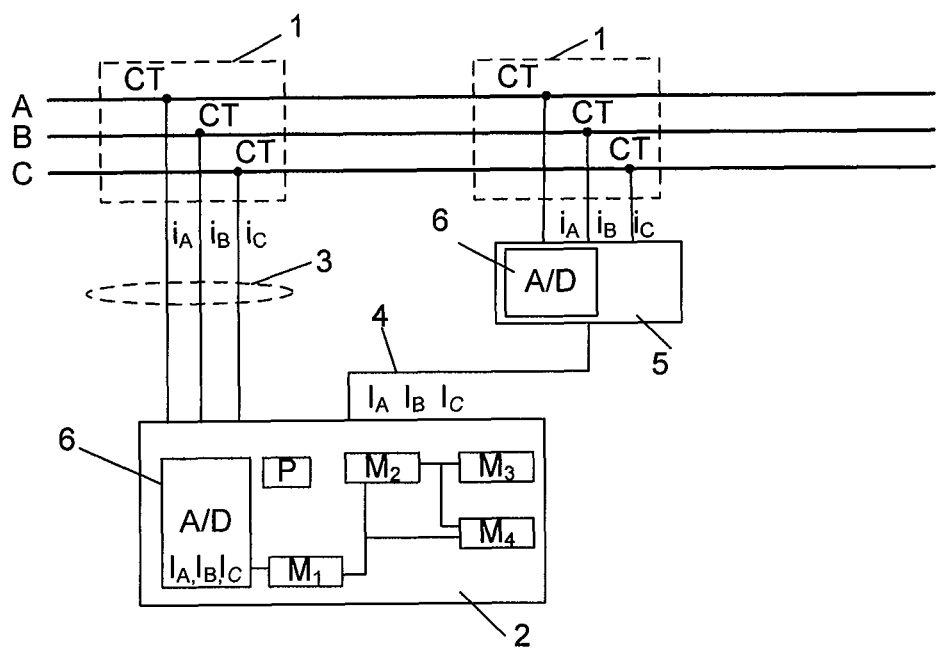
FIG. 1 shows the schematic system for phase selection.
Figure 2:
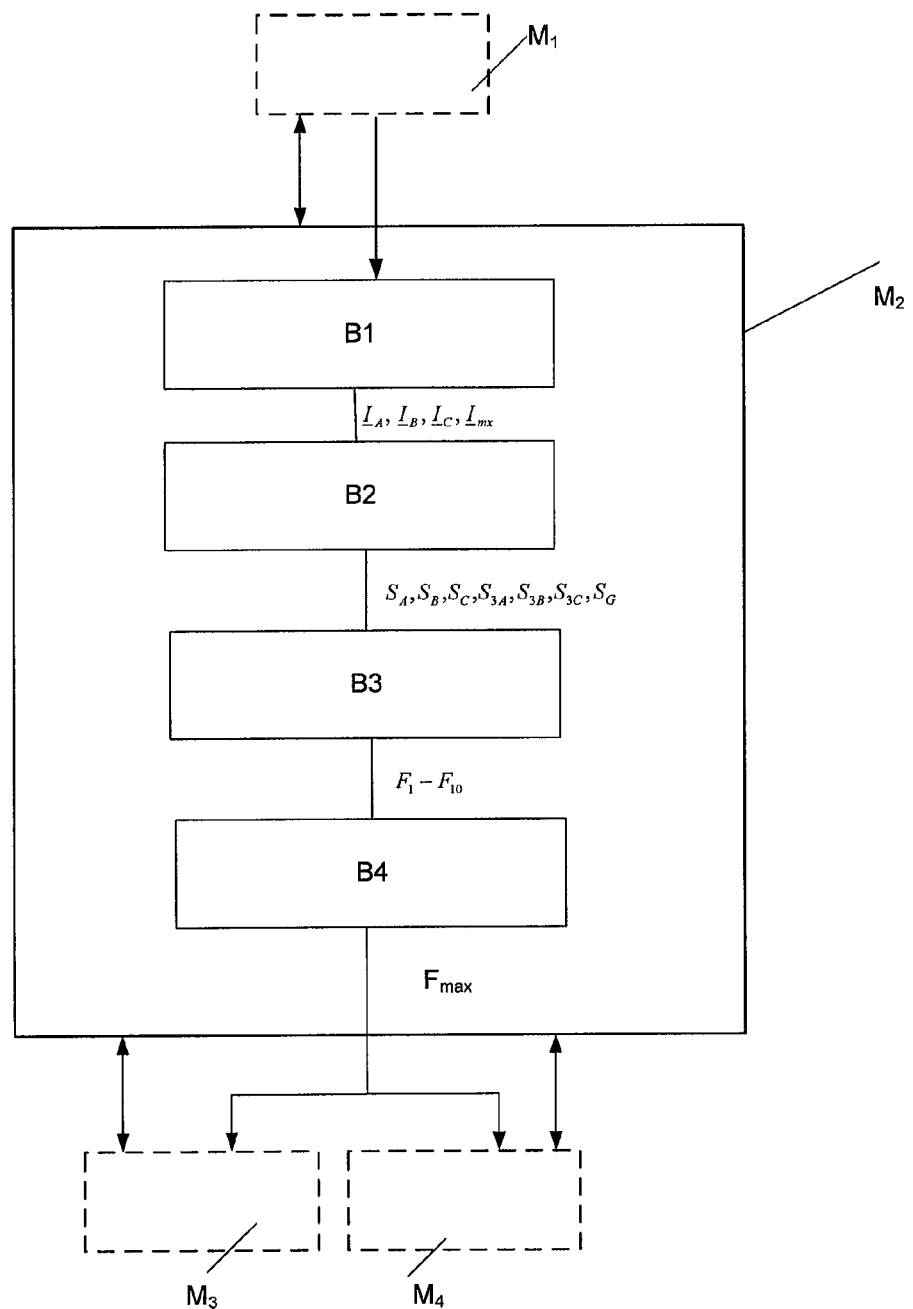
FIG. 2—the inventive part of the system for phase selection in a protection relay, FIG. 3—a set of steps for the realisation of the inventive method.

Current transformers 1 are connected with a protection relay 2 by an analogue wire link 3 or by means of a process communication bus 4 containing a Margin Unit 5. The protection relay 2 with a data processing unit P comprises an A/D converter 6 and an arrangement of functional modules M1, M2, M3, M4 where the module M1 is a buffer module for storing data delivered from an on-line measurement, the module M2 is the inventive fault phase selection and fault type determination module, the module M3 is a calculating module connecting with the others modules and the module M4 is an information module for giving the result of the inventive method. In the case when the protection relay 2 is connected by the communication bus 4, the A/D converter 6 may be placed in the Margin Unit 5 instead of being in the protection relay 2. It is obvious that the protection relay comprises other modules which are essential for the proper operation of the protection relay 2 and which are not described in this description and not presented in the FIG. 1. The fault phase selection and fault type determination module M2, presented in the FIG. 2, comprises a pre-filtering block B1, a data analysis block B2, a selector block B3 and a fault type decision block B4.

Input data, current signals $i_A$, $i_B$, $i_C$, from the individual phases A, B, C are measured by the current transformers 1 and delivered to the A/D converter 6 in the protection relay 2 by the analogue wire link 3 or to the AD/converter 6 in the Margin Unit 5 from which the digitalized current signals $\underline{I}_A$, $\underline{I}_B$, $\underline{I}_C$, are delivered to the protection relay 2 by the communication bus 4. The digital current signals are stored in the buffer module M1. Digital current signals $\underline{I}_A$, $\underline{I}_B$, $\underline{I}_C$ are processed in the module M2 by its functional blocks B1-B4, where data are filtered in a known way using the pre-filtering block B1 (FIG. 2), whose output is connected with the data analysis block B2 in which current signal data are processed and the real value indicators are calculated. The current signals $\underline{I}_A$, $\underline{I}_B$, $\underline{I}_C$ from the pre-filtering block B1 are taken by the data analysis block B2 in such way which does not remove them from this block, thanks to which they are available also for other modules of the protection relay 2. The output of the B2 block is connected with the selector block B3 for the fault type indicators determination. Finally when the fault type is identified in the fault type decision block B4 and information about the fault type is transmitted to the output of the block B4 in such way that this information is available for the other modules M3 and M4 of the protection relay 2.

The method according to the invention is carried out in the following steps:

Step 1

Figure 3:
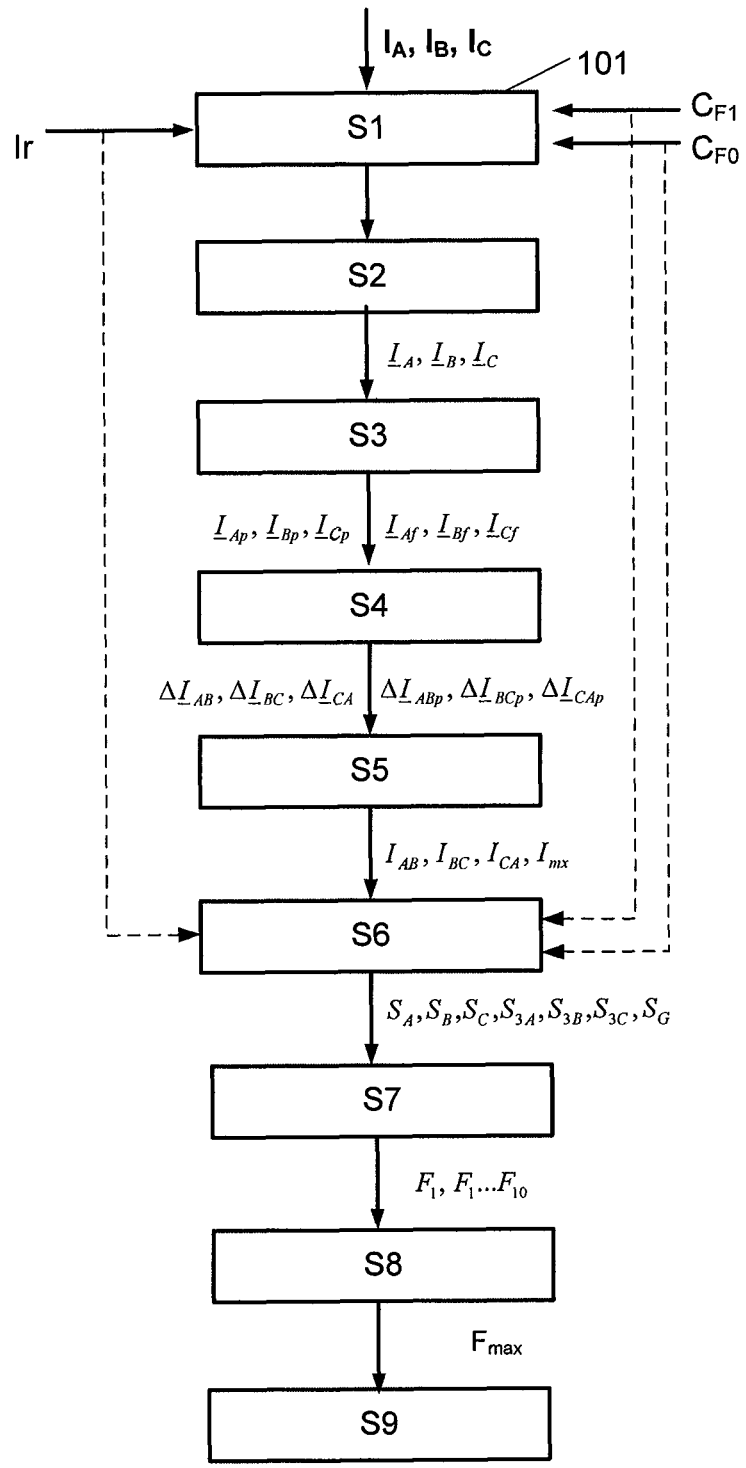

In the first step S1 (FIG. 3) the digital current signals $\underline{I}_A$, $\underline{I}_B$, $\underline{I}_C$, from the individual phases A, B, C and additionally input data: a phase-to-phase fault share coefficient $c_{F1}$, a phase-to-ground fault share coefficient $c_{F0}$, and a RMS value of line rated current $I_r$ which is known for the protected line, are delivered and stored in the buffer module M1 of the protection relay 2.

The phase-to-ground fault share coefficient $c_{F0}$ depicts a predetermined set of coefficients whose value is selected in this way that good sensitivity for phase-to-ground fault and phase-to-phase-to ground fault are achieved.

Generally $c_{F0}$ is determined by the following relation:

$$c_{F0} > \frac{I_r}{3I_{0m}},$$

where:
$3I_{0m}$—presents the minimum detected neutral current signal during phase to ground fault,
$I_r$—presents line RMS rated current signal, Usually, it is assumed that $c_{F0} > 2.0$. In the embodiment of the invention it was set as $c_{F0} = 2.5$.

The phase-to-phase fault share coefficient $c_{F1}$ depicts a predetermined set of coefficients whose value is selected in this way that good selectivity between phase-to-phase and 3-phase and also between and phase to phase to ground fault is accomplished. These conditions are assured for the relation:

$c_{F1} > 3$ and $$\frac{c_{F1}}{c_{F0}} < 3.0.$$

In the embodiment of the invention it was set as $c_{F1} = 5.0$.

Step 2

Next in the step S2 the digital current signals from individual phases $\underline{I}_A$, $\underline{I}_B$, $\underline{I}_C$ are filtered using one of the known methods of filtering, for example a short window Fourier filter method, in order to obtain phasor values of digital current signals $\underline{I}_A$, $\underline{I}_B$, $\underline{I}_C$ for each individual phase A,B,C.

Step 3

In the step S3 the pre-fault current signals $\underline{I}_{Ap}$, $\underline{I}_{Bp}$, $\underline{I}_{Cp}$ and fault current signals $\underline{I}_{Af}$, $\underline{I}_{Bf}$, $\underline{I}_{Cf}$ are determined using internal protection relay signals—fault inceptions time $t_F$. The fault inception time $t_F$ is identified from the analysis of phasor values of digital current signals $\underline{I}_A$, $\underline{I}_B$, $\underline{I}_C$ by common known methods, for example based on numerically computing the first derivative of the current signals and cycle algorithm comparing the present current sample with the current sample one cycle back.

Step 4

In the step S4 the difference values of fault phase current signals $\Delta\underline{I}_{AB}$, $\Delta\underline{I}_{BC}$, $\Delta\underline{I}_{CA}$ and the difference value of pre-fault current signals $\Delta\underline{I}_{ABp}$, $\Delta\underline{I}_{BCp}$, $\Delta\underline{I}_{CAp}$ are determined for each of the phases A, B, C respectively according to the following formulas:

$$\Delta\underline{I}_{AB} = \underline{I}_{Af} - \underline{I}_{Bf},$$

$$\Delta\underline{I}_{BC} = \underline{I}_{Bf} - \underline{I}_{Cf},$$

$$\Delta\underline{I}_{CA} = \underline{I}_{Cf} - \underline{I}_{Af},$$

$$\Delta\underline{I}_{ABp} = \underline{I}_{Ap} - \underline{I}_{Bp},$$

$$\Delta\underline{I}_{BCp} = \underline{I}_{Bp} - \underline{I}_{Cp},$$

$$\Delta\underline{I}_{CAp} = \underline{I}_{Cp} - \underline{I}_{Ap}.$$

Step 5

In the step S5 the absolute values of the incremental current signals $I_{AB}$, $I_{BC}$, $I_{CA}$ are calculated as the absolute value of the difference value of the fault phase current signals $\Delta\underline{I}_{AB}$, $\Delta\underline{I}_{BC}$, $\Delta\underline{I}_{CA}$ and the difference value of the pre-fault current signals $\Delta\underline{I}_{ABp}$, $\Delta\underline{I}_{BCp}$, $\Delta\underline{I}_{CAp}$ as:

$$I_{AB} = \text{abs}(\Delta\underline{I}_{AB} - \Delta\underline{I}_{ABp}),$$

$$I_{BC} = \text{abs}(\Delta\underline{I}_{BC} - \Delta\underline{I}_{BCp}),$$

$$I_{CA} = \text{abs}(\Delta\underline{I}_{CA} - \Delta\underline{I}_{CAp})$$

and next the maximal value of incremental current signal $I_{mx}$ is calculated as:

$$I_{mx} = \max(I_{AB}, I_{BC}, I_{CA}).$$

Step 6

Next in the step S6 real value indicators $S_A, S_B, S_C, S_{3A}, S_{3B}, S_{3C}, S_G$ for all fault types are determined taking into account three types of data:

a) the first type of data concern current based indicators for phase-to-phase faults for which real value indicators $S_A, S_B, S_C$ for each phase A,B,C are calculated as a minimum value of coefficients $x_1, x_2, x_3, x_a, x_b, x_c$:

$$S_A = \min(x_1, x_3, x_a),$$

$$S_B = \min(x_2, x_1, x_b),$$

$$S_C = \min(x_3, x_2, x_c)$$

where:
- $x_1$ is a coefficient calculated as: $x_1 = c_{F1} x_{AB} - 1$,
- $x_2$ is a coefficient calculated as: $x_2 = c_{F1} x_{BC} - 1$,
- $x_3$ is a coefficient calculated as: $x_3 = c_{F1} x_{CA} - 1$,
- $x_a$ is a coefficient calculated as: $x_a = 1 - x_{BC}$,
- $x_b$ is a coefficient calculated as: $x_b = 1 - x_{CA}$,
- $x_c$ is a coefficient calculated as: $x_c = 1 - x_{AB}$, and where:
$c_{F1}$—is the phase-to-phase fault share coefficient delivered to the buffer module M1 in the step 1,
- $x_{AB}$—is a coefficient calculated as: $x_{AB} = I_{AB}/I_{mx}$,
- $x_{BC}$—is a coefficient calculated as: $x_{BC} = I_{BC}/I_{mx}$,
- $x_{CA}$—is a coefficient calculated as: $x_{CA} = I_{CA}/I_{mx}$, b) the second type of data concern current based indicators of a 3-phase fault, the real value indicators $S_{3A}, S_{3B}, S_{3C}$ for each 3-phase fault are calculated as a result of the minimum values of coefficients $x_{BC}, x_{AB}, x_{CA}$ minus the real value indicators $S_A, S_B, S_C$ which were calculated in the first step, as follows:

$$S_{3A} = \min(x_{AB}, x_{CA}) - S_A,$$

$$S_{3B} = \min(x_{BC}, x_{AB}) - S_B,$$

$$S_{3C} = \min(x_{CA}, x_{BC}) - S_C,$$

c) the third type of data concern the indicator for phase-to-ground fault for which real value indicator $S_G$ is calculated according to this formula:

$$S_G = \max(I_{G0}, (I_{G1} - \Delta I_m))/I_{mx}$$

where:
$I_{G1}$—is calculated as: $I_{G1} = c_{F0} \text{abs}(3I_0)$,
$c_{F0}$—is the phase-to-ground fault share coefficient delivered to the buffer module M1 in the step 1.
$I_0$—is a zero sequence current signal calculated as:

$$I_0 = \frac{1}{3}(I_{Af} + I_{Bf} + I_{Cf});$$

$I_{G0}$—is calculated as $I_{G0} = I_{G1} - I_r$, where $I_r$—is the line rated current RMS value delivered to the buffer module M1 in the step 1,
$\Delta I_m$—is calculated as a maximal value of the absolute value of the difference value of fault phase current signals according to the formula:

$$\Delta I_m = \max(\text{abs}(\Delta I_{AB}), \text{abs}(\Delta I_{BC}), \text{abs}(\Delta I_{CA})).$$

Step 7

Next, in the step S7 having the real value indicators $S_A, S_B, S_C, S_{3A}, S_{3B}, S_{3C}, S_G$ and using 'soft' operators as the minimum value of the real value indicators, the fault type indicators $F_1$-$F_{10}$ are calculated to determine the fault type in such a way that:

fault type indicators $F_1$-$F_3$ are calculated for phase-to-ground faults as the sum of the minimum value of the combination of $(S_A, S_G)$, $(S_B, S_G)$, $(S_C, S_G)$, $(S_{3B}, S_{3C})$, $(S_{3C}, S_{3A})$, $(S_{3A}, S_{3B})$ and the real value indicators $S_{3A}, S_{3B}, S_{3C}$ according to the following formulas:

$F_1 = \min(S_A, S_G) + \min(S_{3B}, S_{3C}) - S_{3A}$, for phase $A$ to ground $G$ fault, $F_2 = \min(S_B, S_G) + \min(S_{3C}, S_{3A}) - S_{3B}$, for phase $B$ to ground $G$ fault, $F_3 = \min(S_C, S_G) + \min(S_{3A}, S_{3B}) - S_{3C}$, for phase $C$ to ground $G$ fault, fault type indicators $F_4$-$F_6$ are calculated for phase-to-phase faults as the minimum value of the combination of $(S_A, S_B)$, $(S_B, S_C)$, $(S_C, S_A)$ according to the following formulas:

$F_4 = \min(S_A, S_B)$, for phase $A$ to phase $B$ fault, $F_5 = \min(S_B, S_C)$, for phase $B$ to phase $C$ fault, $F_6 = \min(S_C, S_A)$, for phase $C$ to phase $A$ fault, fault type indicators $F_7$-$F_9$ are calculated for phase-to-phase-to-ground faults as the sum of the previously calculated fault type indicators according to the following formulas:

$F_7 = F_1 + F_2 + F_4$, for phase $A$ to phase $B$ and to ground $G$ fault, $F_8 = F_2 + F_3 + F_5$, for phase $B$ to phase $C$ and to ground $G$ fault, $F_9 = F_3 + F_1 + F_6$, for phase $C$ to phase $A$ and to ground $G$ fault, fault type indicator $F_{10}$ is calculated for a 3-phase fault as the minimal value of the real value indicators $S_{3A}, S_{3B}, S_{3C}$ according to the formula:

$F_{10} = \min(S_{3A}, S_{3B}, S_{3C})$, for phase $A$ to phase $B$ to phase $C$ fault, Step 8

In the next step S8 a maximum of all values of fault type indicators $F_1$-$f_{10}$ are calculated according to this formula:

$$F_{max} = \max(\{F_{flt}\}),$$

where flt is an integer number from 1 to 10,
and next is determined the fault type indicator ($F_1$-$F_{10}$) which has the maximal value, which at the same time determines the fault type on the base that:
- flt=1 is used for phase A to ground G fault,
- flt=2 is used for phase B to ground G fault,
- flt=3 is used for phase C to ground G fault,
- flt=4 is used for phase A to phase B fault,
- flt=5 is used for phase B to phase C fault,
- flt=6 is used for phase C to phase A fault,
- flt=7 is used for phase A to phase B and to ground G fault,
- flt=8 is used for phase B to phase C and to ground G fault,
- flt=9 is used for phase C to phase A and to ground G fault,
- flt=10 is used for phase A to phase B to phase C fault, If $F_{max}$ is bigger than a $\text{thres}_F$ it means that an error is occurred during the fault determination or in fault inception detection.

'$\text{thres}_F$' is a small positive threshold value used to stabilize the algorithm and avoid noise influences.

The typical value is limited to $0 < \text{thres}_F < 0.1$.

Step 9

In the next step S9 the real fault type indicator $F_{max}$ available in each of the modules M1 . . . M4 is transmitted to the display or to printing devices which are connected with one of the modules and which are not presented in the drawing. The information on the selected phase in which the fault occurred is presented to the user of the relay device 2 together with the information about the type of the fault.

The invention claimed is:

1. A method of fault phase selection and fault type determination in electric power lines, comprising:
    connecting an analog/digital converter to the electric power lines to generate digitized current values,
    coupling a protection relay to current transformers associated with electric power lines to receive said digitized current values,
    first receiving said digitized current values in a buffer module maintained in said protection relay, said buffer module storing said digitized current values,
    making use of said protection relay having a fault phase selection and fault type determination module which receives and processes said digitized current values from said buffer module in a pre-filtering block,
    using in said fault phase selection and fault type determination module which receives and processes said digitized current values a fault inception detection and an estimation of fault phase current signals, pre-fault current signals and zero-sequence current in order to receive the absolute value of incremental current signals ($I_{AB}$, $I_{BC}$, $I_{CA}$) which are calculated from difference values of the fault phase current signals and difference values of pre-fault current signals and a maximum value ($I_{mx}$) from the incremental current signals which are delivered from said pre-filtering block to a data-analysis block which generates real value indicators for individual phase faults for each phase ($S_A, S_B, S_C$), real value indicators for 3-phase faults ($S_{3A}, S_{3B}, S_{3C}$) based on the individual phase faults and a real value indicator for ground fault ($S_G$) based on the individual phase faults and the 3-phase faults are determined,
    calculating the maximum of the value of all fault type indicators ($F_{flt}$) in a fault-type decision block according to the formula:

$$F_{max} = \max(\{F_{flt}\}),$$

where the index flt is an integer number from 1 to 10 and means one specific type of all type faults,
    determining the fault type as one of the indicators ($F_{flt}$) having the maximal value in a selector block which receives said indicators from said data analysis block and which delivers them to said fault-type decision block, which at the same time determines the fault type on the basis that the index (flt) means the type of fault, where if:
flt=1 then there is a phase A to ground G fault,
flt=2 then there is a phase B to ground G fault,
flt=3 then there is a phase C to ground G fault,
flt=4 then there is a phase A to phase B fault,
flt=5 then there is a phase B to phase C fault,
flt=6 then there is a phase C to phase A fault,
flt=7 then there is a phase A to phase B and to ground G fault,
flt=8 then there is a phase B to phase C and to ground G fault,
flt=9 then there is a phase C to phase A and to ground G fault,
flt=10 then there is a phase A to phase B to phase C fault;
    calculating in a calculating module linked to said buffer module and said fault phase selection and fault type determination module the fault type indicators ($F_{flt}$) as the minimum values of the real values indicators ($S_A, S_B, S_C, S_{3A}, S_{3B}, S_{3C}, S_G$) in said selector block in the following way:
    calculating the sum of the minimum value of the combination of real value indicators ($S_A, S_G$), ($S_B, S_G$), ($S_C, S_G$), ($S_{3B}, S_{3C}$), ($S_{3C}, S_{3A}$), ($S_{3A}, S_{3B}$) and the real value indicators ($S_{3A}, S_{3B}, S_{3C}$) for phase to ground fault, according to the following formulas:

$F_1 = \min(S_A, S_G) + \min(S_{3B}, S_{3C}) - S_{3A}$, for phase A to ground G fault, $F_2 = \min(S_B, S_G) + \min(S_{3C}, S_{3A}) - S_{3B}$, for phase B to ground G fault, $F_3 = \min(S_C, S_G) + \min(S_{3A}, S_{3B}) - S_{3C}$, for phase C to ground G fault, which gives the first group of indicators ($F_1$-$F_3$);
    calculating the minimum value of the combination of real value indicators ($S_A, S_B$), ($S_B, S_C$), ($S_C, S_A$) for phase to phase fault, according to the following formulas:

$F_4 = \min(S_A, S_B)$, for phase A to phase B fault, $F_5 = \min(S_B, S_C)$, for phase B to phase C fault, $F_6 = \min(S_C, S_A)$, for phase C to phase A fault, which gives the second group indicators ($F_4$-$F_6$);
    calculating the sum of the previously calculated indicator ($F_1$-$F_6$) for phase to phase to ground faults, as the sum of previously calculated fault type indicators according to the following formulas:

$F_7 = F_1 + F_2 + F_4$, for phase A to phase B and to ground G fault, $F_8 = F_2 + F_3 + F_5$, for phase B to phase C and to ground G fault, $F_9 = F_3 + F_1 + F_6$, for phase C to phase A and to ground G fault, which gives the third group indicators ($F_7$-$F_9$);
    calculating the minimum value of real value indicators ($S_{3A}, S_{3B}, S_{3C}$) according to the formula:

$F_{10} = \min(S_{3A}, S_{3B}, S_{3C})$, for phase A to phase B to phase C fault, which gives the indicator ($F_{10}$);
    and
    presenting the real fault type indicator ($F_{max}$) in said protection relay or in an information module connected to said protection relay.

2. A device for implementing the method according to claim 1 of fault phase selection and fault type determination in electric power lines, wherein said pre-filtering block comprises means for current signal filtering, fault inception time identification, pre-fault and fault current signal determination, incremental current calculation and maximal value of incremental current signal calculation, embedded in said protection relay in said pre-filtering block of said fault-phase selection and fault type determination module which further comprises:
    means for calculating real value indicators ($S_A, S_B, S_C, S_{3A}, S_{3B}, S_{3C}$) which indicate the minimum values of a combination of data for phase to phase faults and for a 3-phase fault and indicate the maximum value of data for a phase to ground fault ($S_G$) embedded in the protection relay in said data analysis block of the module of the protection relay, means for calculating fault type indicators ($F_1$-$F_{10}$) as the minimum values of real value indicators embedded in said selector block of the module of the protection relay, means for selecting the fault phase and for determining the fault type by calculating the maximum value of the all fault type indicators ($F_1$-$F_{10}$) embedded in said fault type decision block of the module of the protection relay, means for presenting the data in said information module.

3. A non-transitory computer readable medium containing computer instructions stored therein for causing a computer processor to perform the steps of a method according to claim 1.

4. A device for implementing fault phase selection and fault type determination in electric power lines, comprising a current transformer associated with electric power lines; and an analog/digital converter associated with the electric power lines to generate digitized current values, a protection relay coupled to said analog/digital converter and receiving said digitized current values in a buffer module, said protection relay further comprising a fault phase selection and fault type determination module which receives said digitized current values from said buffer module into an embedded pre-filtering block, said embedded pre-filtering block including current signal filtering, fault inception time identification, pre-fault and fault current signal determination, incremental current calculation and maximal value of incremental current signal calculation of incremental current signal calculation, said protection relay further comprising means for current signal filtering, fault inception time identification, pre-fault and fault current signal determination, incremental current calculation and maximal value of incremental current signal calculation, embedded in a said pre-filtering block of said fault phase selection and fault type determination module which further comprises:

a data analysis block that receives phasor values of said digitized current values from said pre-filtering block and calculates real value indicators ($S_A$,$S_B$,$S_C$,$S_{3A}$,$S_{3B}$,$S_{3C}$) which indicate the minimum values of a combination of data for individual phase faults for each phase ($S_A$, $S_B$, $S_C$) and for 3-phase faults ($S_{3A}$, $S_{3B}$, $S_{3C}$) and indicate the maximum value of data for a phase to ground fault ($S_G$) based on the individual phase faults and the 3-phase faults;

a selector block that calculates fault type indicators ($F_1$-$F_{10}$) as the minimum values of real value indicators received from and calculated by said data analysis block;

a fault type decision block that selects the fault phase and determines the fault type by calculating the maximum value of all fault type indicators ($F_1$-$F_{10}$) received from said selector block, wherein $F_1=\min(S_A,S_G)+\min(S_{3B},S_{3C})-S_{3A}$, $F_2=\min(S_B,S_G)+\min(S_{3C},S_{3A})-S_{3B}$, $F_3=\min(S_C,S_G)+\min(S_{3A},S_{3B})-S_{3C}$, $F_4=\min(S_A,S_B)$, $F_5=\min(S_B,S_C)$, $F_6=\min(S_C,S_A)$, $F_7=F_1+F_2+F_4$, $F_8=F_2+F_3+F_5$, $F_9=F_3+F_4+F_6$, and $F_{10}=\min(S_{3A},S_{3B},S_{3C})$; and said information module in the protection relay to present the data calculated in said data analysis block, said selector block, and said fault type decision block.

5. The device according to claim 4, wherein the fault type indicators are calculated as the minimum values of the real values indicators ($S_A$,$S_B$,$S_C$,$S_{3A}$,$S_{3B}$,$S_{3C}$,$S_G$) in the following way:

calculating the sum of the minimum value of the combination of real value indicators ($S_A$,$S_G$), ($S_B$,$S_G$), ($S_C$,$S_G$), ($S_{3B}$,$S_{3C}$), ($S_{3C}$,$S_{3A}$), ($S_{3A}$,$S_{3B}$) and the real value indicators ($S_{3A}$,$S_{3B}$,$S_{3C}$) for phase to ground fault, according to the following formulas:

$F_1=\min(S_A,S_G)+\min(S_{3B},S_{3C})-S_{3A}$, for phase $A$ to ground $G$ fault, $F_2=\min(S_B,S_G)+\min(S_{3C},S_{3A})-S_{3B}$, for phase $B$ to ground $G$ fault, $F_3=\min(S_C,S_G)+\min(S_{3A},S_{3B})-S_{3C}$, for phase $C$ to ground $G$ fault, which gives the first group of indicators ($F_1$-$F_3$);

calculating the minimum value of the combination of real value indicators ($S_A$,$S_B$), ($S_B$,$S_C$), ($S_C$,$S_A$) for phase to phase fault, according to the following formulas:

$F_4=\min(S_A,S_B)$, for phase $A$ to phase $B$ fault, $F_5=\min(S_B,S_C)$, for phase $B$ to phase $C$ fault, $F_6=\min(S_C,S_A)$, for phase $C$ to phase $A$ fault, which gives the second group indicators ($F_4$-$F_6$);

calculating the sum of the previously calculated indicator ($F_1$-$F_6$) for phase to phase to ground faults, as the sum of previously calculated fault type indicators according to the following formulas:

$F_7=F_1+F_2+F_4$, for phase $A$ to phase $B$ and to ground $G$ fault, $F_8=F_2+F_3+F_5$, for phase $B$ to phase $C$ and to ground $G$ fault, $F_9=F_3+F_1+F_6$, for phase $C$ to phase $A$ and to ground $G$ fault, which gives the third group indicators ($F_7$-$F_9$);

calculating the minimum value of real value indicators ($S_{3A}$,$S_{3B}$,$S_{3C}$) according to the formula:

$F_{10}=\min(S_{3A},S_{3B},S_{3C})$, for phase $A$ to phase $B$ to phase $C$ fault, which gives the indicator ($F_{10}$).

6. A non-transitory computer-readable medium containing computer instructions stored therein for causing a computer processor to perform a method of fault phase selection and fault type determination in electric power lines, making use of a protection relay having a buffer module for storing digitized current values detected from the electric power lines, said buffer module delivering said digitized current values to a fault phase selection and fault type determination module which receives and processes said digitized current values, using in said fault phase selection and fault type determination module a pre-filtering block which utilizes a fault inception detection and an estimation of fault phase current signals, pre-fault current signals and zero-sequence current in order to receive the absolute value of incremental current signals ($I_{AB}$, $I_{BC}$, $I_{CA}$) which are calculated from difference values of the fault phase current signals and difference values of pre-fault current signals and a maximum value ($I_{mx}$) from the incremental current signals which are delivered from said pre-filtering block to a data-analysis block which generates real value indicators for individual phase faults for each phase ($S_A, S_B, S_C$), real value indicators for 3-phase faults ($S_{3A}, S_{3B}, S_{3C}$) based on the individual phase faults and a real value indicator for ground fault ($S_G$) based on the individual phase faults and the 3-phase faults are determined, the method comprising:

calculating the maximum of the value of all fault type indicators ($F_{flt}$) in a fault-type decision block according to the formula:

$$F_{max} = \max(\{F_{flt}\}),$$

where the index flt is an integer number from 1 to 10 and means one specific type of all type faults, determining of the fault type as one of the indicators ($F_{flt}$) having the maximal value in a selector block which receives said indicators from said data analysis block and which delivers them to said fault-type decision block, which at the same time determines the fault type on the basis that the index (flt) means the type of fault, where if:

flt=1 then there is a phase A to ground G fault,
flt=2 then there is a phase B to ground G fault,
flt=3 then there is a phase C to ground G fault,
flt=4 then there is a phase A to phase B fault,
flt=5 then there is a phase B to phase C fault,
flt=6 then there is a phase C to phase A fault,
flt=7 then there is a phase A to phase B and to ground G fault,
flt=8 then there is a phase B to phase C and to ground G fault,
flt=9 then there is a phase C to phase A and to ground G fault,
flt=10 then there is a phase A to phase B to phase C fault;

calculating in a calculating module linked to said buffer module and said fault phase selection and fault type determination module the fault type indicators ($F_{flt}$) as the minimum values of the real values indicators ($S_A, S_B, S_C, S_{3A}, S_{3B}, S_{3C}, S_G$) in said selector block in the following way:

calculating the sum of the minimum value of the combination of real value indicators ($S_A, S_G$), ($S_B, S_G$), ($S_C, S_G$), ($S_{3B}, S_{3C}$), ($S_{3C}, S_{3A}$), ($S_{3A}, S_{3B}$) and the real value indicators ($S_{3A}, S_{3B}, S_{3C}$) for phase to ground fault, according to the following formulas:

$$= \min(S_A, S_G) + \min(S_{3B}, S_{3C}) - S_{3A}, \text{ for phase } A \text{ to ground } G \text{ fault,}$$

$$F_2 = \min(S_B, S_G) + \min(S_{3C}, S_{3A}) - S_{3B}, \text{ for phase } B \text{ to ground } G \text{ fault,}$$

$$F_3 = \min(S_C, S_G) + \min(S_{3A}, S_{3B}) - S_{3C}, \text{ for phase } C \text{ to ground } G \text{ fault,}$$

which gives the first group of indicators ($F_1$-$F_3$);

calculating the minimum value of the combination of real value indicators ($S_A, S_B$), ($S_B, S_C$), ($S_C, S_A$) for phase to phase fault, according to the following formulas:

$$F_4 = \min(S_A, S_B), \text{ for phase } A \text{ to phase } B \text{ fault,}$$

$$F_5 = \min(S_B, S_C), \text{ for phase } B \text{ to phase } C \text{ fault,}$$

$$F_6 = \min(S_C, S_A), \text{ for phase } C \text{ to phase } A \text{ fault,}$$

which gives the second group indicators ($F_4$-$F_6$);

calculating the sum of the previously calculated indicator ($F_1$-$F_6$) for phase to phase to ground faults, as the sum of previously calculated fault type indicators according to the following formulas:

$$F_7 = F_1 + F_2 + F_4, \text{ for phase } A \text{ to phase } B \text{ and to ground } G \text{ fault,}$$

$$F_8 = F_2 + F_3 + F_5, \text{ for phase } B \text{ to phase } C \text{ and to ground } G \text{ fault,}$$

$$F_9 = F_3 + F_1 + F_6, \text{ for phase } C \text{ to phase } A \text{ and to ground } G \text{ fault,}$$

which gives the third group indicators ($F_7$-$F_9$);

calculating the minimum value of real value indicators ($S_{3A}, S_{3B}, S_{3C}$) according to the formula:

$$F_{10} = \min(S_{3A}, S_{3B}, S_{3C}), \text{ for phase } A \text{ to phase } B \text{ to phase } C \text{ fault, which gives the indicator } (F_{10});$$

and presenting the real fault type indicator ($F_{max}$) determined in a tangible medium.

* * * * *

UNITED STATES PATENT AND TRADEMARK OFFICE
CERTIFICATE OF CORRECTION

PATENT NO. : 9,118,181 B2
APPLICATION NO. : 13/384637
DATED : August 25, 2015
INVENTOR(S) : Przemyslaw Balcerek et al.

Page 1 of 1

It is certified that error appears in the above-identified patent and that said Letters Patent is hereby corrected as shown below:

In the claims,
In Column 11, line 34 (Claim 4, line 22) the words "embedded in a" should read --embedded in--
In Column 14, line 3 (Claim 6, line 60) the words " $= \min(S_A, S_G) + \min(S_{3B}, S_{3C}) - S_{3A}$, for phase A to ,, should read -- $F_1 = \min(S_A, S_G) + \min(S_{3B}, S_{3C}) - S_{3A}$, for phase A to --

Signed and Sealed this
Tenth Day of May, 2016

Michelle K. Lee
*Director of the United States Patent and Trademark Office*